(12) United States Patent
Kampbell et al.

(10) Patent No.: US 6,942,426 B1
(45) Date of Patent: Sep. 13, 2005

(54) PROCESS AND APPARATUS FOR REPAIRING PIPES

(75) Inventors: Norman E. Kampbell, Hilliard, OH (US); Lee R. Cuba, Bedford, IN (US)

(73) Assignee: Inliner Technologies, LLC, Paoli, IN (US)

( * ) Notice: Subject to any disclaimer, the term of this patent is extended or adjusted under 35 U.S.C. 154(b) by 13 days.

(21) Appl. No.: 10/441,504

(22) Filed: May 20, 2003

(51) Int. Cl.[7] ............................................. F16L 55/18
(52) U.S. Cl. ................... 405/184.2; 405/156; 138/98; 138/97
(58) Field of Search ......................... 405/184.2, 184.1; 138/97, 98

(56) References Cited

U.S. PATENT DOCUMENTS

| | | | |
|---|---|---|---|
| 4,714,095 A | 12/1987 | Muller et al. | |
| 4,770,562 A | 9/1988 | Muller et al. | |
| 5,029,615 A | 7/1991 | Muller et al. | |
| 5,609,439 A | 3/1997 | Schreiner et al. | |
| 5,653,555 A | * 8/1997 | Catallo | 405/184.2 |
| 6,270,289 B1 | 8/2001 | Einhaus et al. | |
| 6,390,795 B1 | 5/2002 | Waring et al. | |
| 6,416,692 B1 | 7/2002 | Iwasake-Higbee | |
| 6,427,726 B1 | 8/2002 | Kiest | |
| 6,478,054 B1 | 11/2002 | Kiest | |
| 6,539,979 B1 | * 4/2003 | Driver | 138/98 |
| 6,619,886 B1 | * 9/2003 | Harrington | 405/184.2 |
| 6,708,728 B2 | * 3/2004 | Driver et al. | 405/184.2 |
| 2003/0138298 A1 | * 7/2003 | Mercier | 405/184.2 |

* cited by examiner

*Primary Examiner*—Frederick L. Lagman
(74) *Attorney, Agent, or Firm*—Krieg DeVault Lundy LLP (57) ABSTRACT

A two-stage process for repairing pipes at elevated temperatures and at elevated pressure. The process comprises the steps of preparing and displacing a hose assembly within the pipeline needing repair. A pressure medium is then introduced into the hose assembly raising the first temperature to initiate and facilitate the cross-linking reaction, and then raising the temperature to a second temperature range and pressure to cure or harden the resin. Novel manifolds and access tubes which allow the practicing the process safely are also provided.

29 Claims, 6 Drawing Sheets

PROCESS AND APPARATUS FOR REPAIRING PIPES

DETAILED DESCRIPTION OF SPECIFIC EMBODIMENTS

The disclosed inventions relate generally to a process for repairing pipelines, specifically a high temperature and high pressure process for curing resin impregnated in a flexible liner used to line or repair the inner surface of a segment of pipe or pipeline, and apparatus used to practice the several embodiments of the disclosed process.

The first step in the disclosed process of lining a pipe comprises isolating a segment of pipe requiring relining. The next step requires preparing a hose assembly comprising a flexible liner impregnated within a resin. The hose assembly is then inserted into the segment of pipe requiring relining so that it extends generally longitudinally through the pipe. The hose assembly is then closed at each end to allow it to be selectively inflated, heated or cooled, and at least one end is connected to a source capable of inserting a pressurized medium to a source capable of inserting a gas into the hose assembly. Thermocouples, or other means for measuring temperature, are placed at selected locations on the inner surface of the segment of pipe. By injecting a pressurized medium into the hose assembly, the hose assembly is expanded so that the hose assembly contacts the inner surface of the pipe.

The temperature of the hose assembly is then elevated to a first temperature range to initiate or facilitate cross-linking of the resin. In one version, a heated pressurized medium is introduced into the hose assembly to elevate the temperature. Once the exothermic cross-linking reaction has been observed or monitored, the temperature of the hose assembly is elevated to a second temperature range. While there may be some overlap between the first and second temperature ranges, the second temperature range is generally higher than the first temperature range. The hose assembly is maintained within the second temperature range for a selected time to allow the resin to cure at the inner surface of the pipe. The hose assembly 10 is maintained at such temperature and pressure levels during the resin curing stage so that the flexible liner 20 is pressed tight against the inner surface 42 of the pipe 40. Even though the flexible liner 20 and resin may not adhere to the inner surface 42, the cured resin and flexible liner form a sufficiently hard and water impermeable barrier thereby lining the pipe 40. Once the selected time has transpired, the heated pressure medium is evacuated from the hose assembly.

A hose assembly 10 is prepared by selecting a resin impregnated flexible liner 20 of appropriate length and diameter. The flexible liner 20 may comprise any fabric known in the industry such as, but not limited to, polyester felt, fiber fleece or natural or synthetic materials, or any combination thereof, for example as described in U.S. Pat. Nos. 4,714,095, 4,770,562, 5,029,615, 5,609,439, 6,270,289 and 6,227,764. In one version, the hose assembly 10 comprises the flexible liner 20. In another version, the hose assembly 10 comprises the flexible liner 20 and a calibration hose 30 placed within the flexible liner 20 in a generally concentric or coaxial arrangement. Using existing methodologies and operations, such as but not limited to, direct inversion or pulled-in-place technologies, the hose assembly 10 is inserted into a segment of a pipe 40. In one version, the pulled-in-place methodology employs a flexible liner 20 and a calibration hose 30, whereas the direct inversion technique employs only a flexible liner 20. The particular methodology chosen for the disclosed process depends primarily on the site specific rigors of the particular installation. These methodologies are generally known to the artisan, and discussions of these methodologies and operations are not detailed here.

Figure 1:
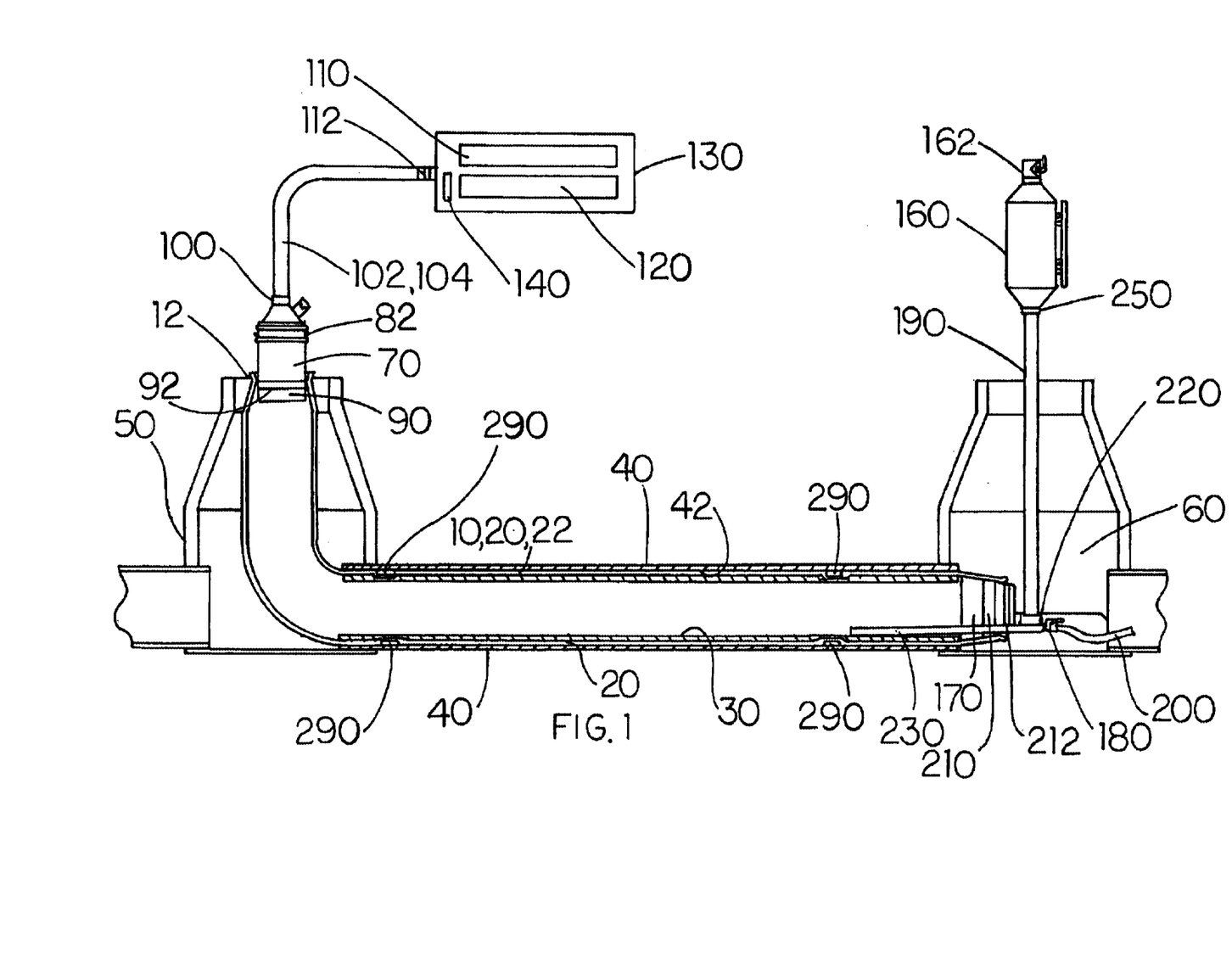
FIG. 1 shows a cross-section view of a sewer pipe and the devices used to practice the disclosed invention.
Figure 2A:
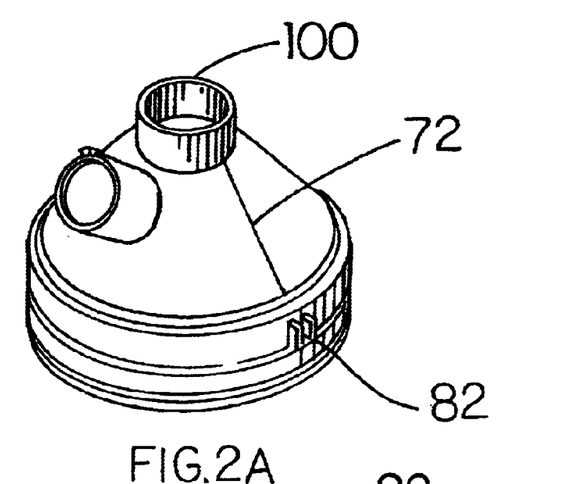
FIG. 2a is a perspective view of the upper portion of the first manifold.
Figure 2B:
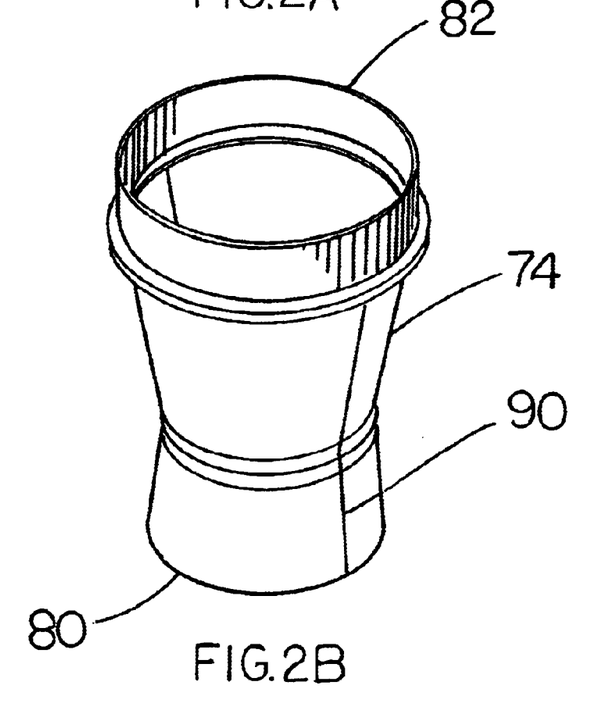
FIG. 2b is a perspective view of the lower portion of the first manifold.
Figure 3A:
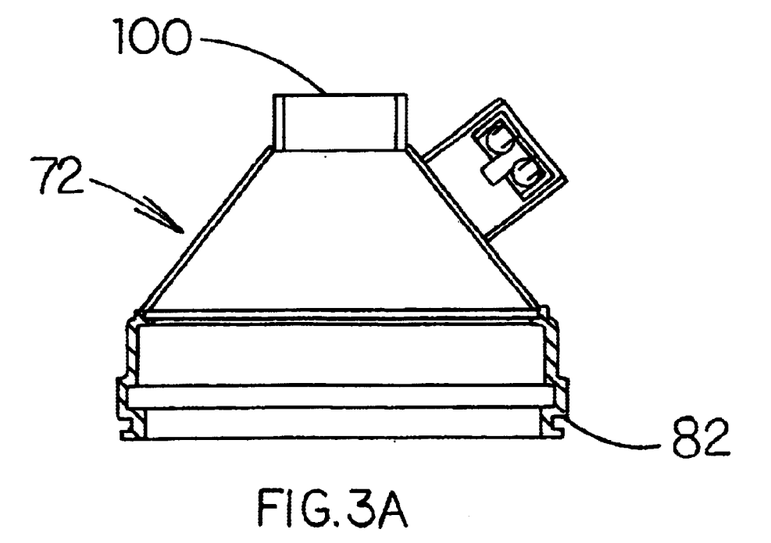
FIG. 3a is a cross-section view of the upper portion of the first manifold.
Figure 3B:
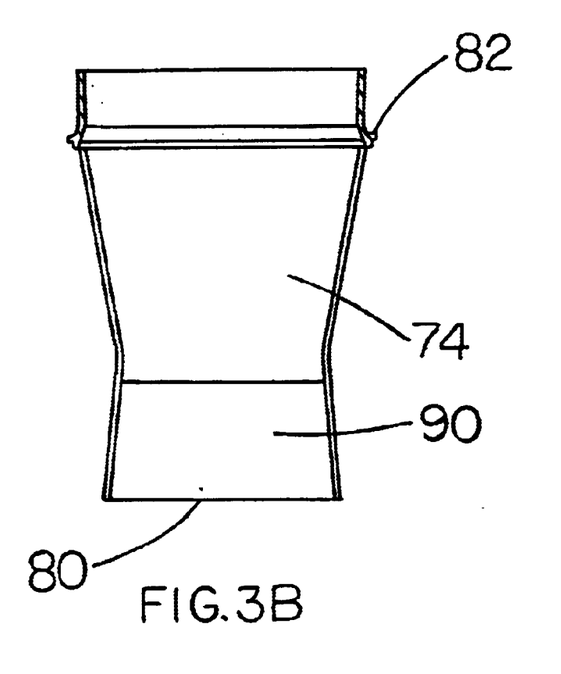
FIG. 3b is a cross-section view of the lower portion of the first manifold.

As shown in FIG. 1, the hose assembly 10 will generally extend through the segment of pipe 40 from about a first access point 50 to about a second access point 60. The first end 12 and a second end 14 of the hose assembly 10 are located respectively in proximity to the first and second access points 50, 60 when the hose assembly 10 is in the pipe 40.

A first manifold 70, specifically the lower portion 74, (FIGS. 2A, 2B, 3A and 3B), is attached to the first end 12 of the hose assembly 10. In one version, the first manifold 70 is attached to the first end 12 of the hose assembly 10 before the hose assembly 10 is extended through the pipe 40. In another version, the first manifold 70 is attached to the first end 12 of the hose assembly 10 after the hose assembly 10 is extended through the pipe 40.

The first manifold 70 is removably secured to the hose assembly 10 by inserting the lower portion 74 into the first end 12 and binding the hose assembly 10 around the tapered barrel 90 of the first manifold 70. The opening 80 is inserted into the first end 12 leaving the connector portion 82 outside the hose assembly 10. The hose assembly 10 may be secured around the tapered barrel 90 using a banding clamp 92, a strap, an elastic band, tape, or any other generally circular or closed configuration, or any combination thereof, having a circumference that can be tightened around the hose assembly 10 and the tapered barrel 90.

The hose assembly 10 is extended longitudinally through the segment of pipeline 40. In one version, the hose assembly 10 is rolled or everted through the pipeline 40. In one version, air or gas may be introduced into the hose assembly 10 through the first manifold 70 to extend the hose assembly 10 through the pipe 40. In yet another version, the air or gas being introduced into the hose assembly 10 is cooled.

After the hose assembly 10 is extended through the pipe 40, a second manifold 170 is removably secured to the second end 14. In one version, once the hose assembly 10 is extended through the pipe 40, the air or gas being introduced into the hose assembly 10 is stopped and the gas or air in the hose assembly 10 is released and a second manifold 170 is attached to the second end 14. The second manifold 170 is removably secured to the second end 14 in substantially the same manner as the lower portion 74 is removably attached to the first end 12 by inserting the tapered barrel 210 into the second end 14 and securing the hose assembly 10 thereto. When the first and second manifolds 70, 170 are respectively attached to the first and second ends 12, 14, the hose assembly 10 becomes substantially an air-tight pressure vessel capable of selectively receiving, containing and releasing the heated pressurized medium, gas or air.

A pressurized medium is then injected or introduced into the hose assembly 10 to expand the hose assembly 10 against the inner surface of the pipe 42. In one version comprising the flexible liner 20, the hose assembly 10 is expanded by increasing the volume of the pressurized medium within the flexible liner 20 until the exterior surface 22 of the flexible liner 20 comes into contact with the interior surface 42 of the pipe 40. In one version using a calibration hose 30, the calibration hose 30 is expanded as the volume of the pressure medium or gas increases within the calibration hose 30. As the calibration hose 30 expands it presses the exterior surface 22 of the flexible liner 20 against the inner surface 42 of the pipe 40.

In one version, the pressurized medium comprises a liquid. In another version, the pressurized medium is a gas. In one version the pressurized medium is heated. In another version, the pressurized medium is steam. In yet another version, the pressurized medium is air. In one version, two sources of pressurized medium are used. In one version steam and air are used and can be mixed in selected percentages before being introduced into the hose assembly 10.

In one version, a collection tube 230 is inserted into the hose assembly 10 so that the collection tube 230 extends from a selected point where liquid may accumulate within the hose assembly 10 to the second manifold 170. The collection-tube 230 comprises any commercially available tubing material suitable for carrying a liquid that will withstand the temperature and pressure ranges described herein. In one version, the collection tube 230 is a perforated tube. In another version, the collection tube 230 comprises a plastic material, such as for example, polypropylene, urethane, or polyvinyl. In another version, the collection tube 230 comprises a natural or synthetic rubber tube. In another version, the collection tube 230 comprises a metal tube. In yet another version, the collection tube 230 comprises a fabric or cloth hose.

A plurality of thermocouples 290 capable of measuring and transmitting temperature readings are removably affixed to selected locations on the inner surface 42 of the segment of pipe 40. In one version, the thermocouples are attached to the exterior surface 22 of the flexible liner 20. The thermocouples may be affixed to the inner surface 42 or the exterior surface 22 using an adhesive or other suitable fastening means. In one version, four thermocouples are removably secured in the pipe 40 in proximity to the first and second access points 50, 60 two at each end. The thermocouples 290 are operatively connected to a device to display the temperature at the selected locations on the inner surface 42 of the segment of pipe 40. The thermocouples 290 allow for monitoring the temperature at the interface of the exterior surface 22 of the flexible liner 20 and the inner surface 42 of the pipe 40. In one version, the first and second control stations 130, 160 may comprise means for displaying the temperature readings from the thermocouples 290. In one version, monitoring the temperature allows for the heated pressurized medium to be maintained within the hose assembly 10 for the shortest time necessary first to initiate the cross-linking reaction of the resin, and second to cure the resin.

The temperature within the hose assembly 10 is elevated to a first temperature range to initiate cross-linking of the resin. In one version, the heated pressurized medium is introduced from the first source 110, through the first manifold 70, into the hose assembly 10. In another version, the air or gas may be evacuated through a second control station 160 while the heated pressurized medium is being introduced into the hose assembly 10 from the first control station 130. The first temperature range must be sufficiently high to initiate the resin cross-linking reaction. In one version, the first temperature range is at least about 110 degrees Fahrenheit but not more than about 200 degrees Fahrenheit. The temperature at which the cross-linking occurs depends on the type of resin being used, specifically the kind and concentration of isocyonate in the resin.

By selectively controlling the volume or flow rate of heated pressurized medium being introduced into the hose assembly 10, the maximum amount of pressure, as recommended by the manufacturer, exerted radially on the flexible liner 20 can be achieved. The pressure limitations vary depending on the length and diameter of the pipe 40 being rehabilitated and the thickness or composition of the flexible liner 20. The various manufacturers of flexible liners 20 provide instructions or guidelines relating to the amount of pressure or temperature that may be executed on the flexible liner 20 before the resin cures. If too much pressure is applied, the flexible liner 20 will stretch to the extent that its structural integrity may be adversely affected.

Generally, the thickness of the hose assembly 10 increases as the diameter of the pipe 40 increases. As the thickness of the hose assembly 10 increases, it becomes more important to monitor the first temperature range; in particular, it is important not to overheat the hose assembly 10. Applications involving larger diameter pipes 40 and, therefore, relatively thicker hose assemblies 10, will have relatively lower or cooler first temperature range than applications involving smaller diameter pipes 40 and correspondingly less thick hose assemblies 10.

The term cross-linking means the chemical reaction of basic molecules into a network of connected molecules. The final properties of the resin depend on the degree of cross-linking. A cured resin having a large number linking points will be much harder than a cured resin having a small number of linking points. The cross-linking occurs by adding a small monomer molecule such as styrene. The monomer provides the link between the polymer chains.

The first temperature range is maintained until the exothermic cross-linking reaction is observed. The volume of gas within the hose assembly 10 is selectively adjusted to ensure that the temperature within the hose assembly 10 does not substantially or materially exceed the first temperature range. The exact time to maintain the hose assembly 10 within the first temperature range depends on several factors, including without limitation, the type of resin, the diameter of the pipeline, the length of the pipeline being repaired or rehabilitated, the thickness of the flexible liner 20, and the ambient temperature and pressure at or within the pipe 40. The thermocouples 290 are monitored to determine when the cross-linking has initiated. Because the cross-linking process is exotherinic, the thermocouples 290 will register a measurable temperature increase when the cross-linking reaction occurs, which in one version, will be observed at the first or second control stations 130, 160.

If the resin gets too hot before cross-linking occurs, one or more components of the resin will start to boil thereby deteriorating the resin, weakening the resulting hardened hose assembly 10, or causing the resin to cure improperly. If the flexible liner 20 is over heated it may blister or also bubble thereby decreasing its strength and reducing the effectiveness of the relining process.

After the cross-linking is completed, the temperature within the hose assembly 10 is increased to a second temperature range to facilitate or expedite the resin curing process. Although some overlap may exist between the first and second temperature ranges, the upper end of second temperature range is generally higher than the upper end of the first temperature range because the cross-linking reaction removes the risk of damaging the resin of the flexible liner 20 of the hose assembly 10. In one version, the heated pressure medium is introduced into the hose assembly 10 to elevate the temperature to a second temperature range. The increased volume of the heated pressure medium also increases the pressure within the hose assembly 10 up to a maximum of about 15 pounds per square inch. In one version, the temperature within the hose assembly 10 is elevated to the second temperature range by decreasing or stopping the volume of the air or gas leaving the hose assembly at the second control station 160. In another version, the temperature is elevated to the second temperature range by increasing the volume of heated pressurized medium being introduced through the first manifold 70, allowing the air or gas to exit the hose assembly 10 from the second manifold 170 until the heated pressure medium starts to exit the hose assembly 10 from the second manifold 170, and then closing the second control station 160.

In one version, the introduction of the pressurized medium is continued throughout the two heating stages to promote or facilitate the movement of the medium from the first end 12 to the second end 14 of the hose assembly 10, to prevent boiling of components in the resin, to prevent blistering of the flexible liner 20, and to equalize or normalize the heat gradient throughout the hose assembly 10.

The lowest temperature of the second temperature range must be sufficient to quicken the resin curing. The highest temperature of the second temperature range is not more than about 300 degrees Fahrenheit. In one version, the lowest temperature of the second temperature range is at least 150 degrees Fahrenheit. In another version, the lowest temperature of the second temperature range is at least 200 degrees Fahrenheit, and the highest temperature of the second temperature ranges is not more than about 260 degrees Fahrenheit.

The temperature within the hose assembly 10 is monitored using the thermocouples 290. In one version, the thermocouple displaying the lowest temperature reading is used to determine the time necessary to maintain the hose assembly 10 within the second temperature range. Referring to Chart 1, Curve 1 represents the minimum time for which the second temperature range must be maintained. In general, the lower the measured temperature at the thermocouple 290 recording the coolest temperature, the longer the temperature must be maintained at that lowest measured temperature. Curve 2 represents relationships of temperature and time analogous to those of Curve 1, but the times to be maintained for a given measured temperature are twice the times shown in Curve 1. In one version, the hose assembly 10 is maintained within the second temperature range until the thermocouple showing the lowest temperature is maintained for the corresponding time as shown in Curve 1 of Chart 1. In yet another version, the hose assembly 10 is maintained at the second temperature range until the thermocouple showing the lowest temperature is maintained for the corresponding time as shown in Curve 2 of Chart 1.

The curing times disclosed in Chart 1 are representative of times that will ensure that the resin has cured. The curing time depends on the temperature and pressure achieved at the interface of the hose assembly 10 and the pipe 40. Higher temperatures, and thus quicker curing times, may be achieved under different conditions without departing from the scope of the disclosed invention.

CHART 1

CURING TIME

The disclosed invention will work with various types of resins, including without limitation, polyester, vinyl ester and epoxy. In one version, isophthalic polyester resin is used. In another version, vinyl ester resin are used. In yet another variation, epoxy resins may be used. The resin may be styrenated or non-styrenated. Examples of resins used include without limitation Reichhold Polylite® 33420, (a thixotropic isophthalic polyester resin), Interplastic Corporation's COR 72-AA-455 (an unsaturated polyester resin) and Ashland Chemicals' Aropol MR 12018 (unsaturated polyester orthophthalic resin).

Once the resin has cured, the hose assembly is cooled. In one version, the hose assembly 10 is air cooled. In another version, the heated pressurized medium is exhausted through the second manifold 170. In yet another version, the air or gas is introduced into the hose assembly 10. In yet another version, the air or gas is chilled or cooled before being introduced to cool the hose assembly 10. In one version, the hose assembly 10 is cooled until the temperature reading at all the thermocouples 290 is less than about 100 degrees Fahrenheit.

The foregoing described process may be practiced using the following described apparatus.

A first control station 130 is provided. The first control station 130 comprises a first source 110 of heated pressurized medium, a second source 120 of gas, a first control value 112, and a chiller 140. The first control station 130 is operatively connected to the first manifold 70 by way of the first or second hoses or lines 102, 104, or any combination thereof.

The first source 110 provides the heated pressurized medium of varying temperature. In one version, the first source 110 comprises a steam generator. In another version, the first source 110 comprises a hot water boiler. In one version, a first hose or line 102 operatively connects the first source 110 to the first manifold.

The second source 120 provides the air or gas into the first manifold 70. In one version, the second source 120 is an air compressor. In another version, the second source 120 is a reservoir suitable for containing and selectively releasing a gas. In another version, the second source 120 is provided with a chiller 140 located operatively on the discharge end of the second source 120 to provide cooled gas or air into the hose assembly 10. A second hose or line 104 operatively connects the second source 120 and the first manifold 70.

In one version, the first source 110 and the second source 120 are located on a truck or a trailer. In another version, the first and second source 110, 120 are operatively connected to the first manifold 70 with separate hoses or lines 102, 104. In yet another version, the same line or hose 102 may be used to transfer the heated pressurized medium and the air or gas from the first and second sources 110, 120 to the first manifold 70. A first control valve 112 regulates the volume of heated pressurized medium and gas or air to adjust the temperature as needed. The control valve 112 may be operatively positioned at the first control station 130, along the hoses 102, 104 orat the first manifold 70.

Referring to FIGS. 2A and 2B, 3A and 3B, the first manifold 70 comprises an upper portion 72 and a lower portion 74. The upper portion 72 comprises one or more ports 100. The ports 100 will be suitable for removably affixing one or more hoses or lines 102, 104 extending from the first source 110. The upper portion 72 and the lower portion 74 each comprise a connector portion 82 and are releasably attached to each other. The connector portions comprise screw-type threads, screws, bolts, hooks, fasteners, clasps, or any combination thereof In one version, the connector portion 82 comprises a male half of a male-female connector that is inserted into the upper portion 72, wherein, the upper portion 72 and the lower portion 74 comprise gaskets to provide an air-tight seal and are connected to each other using a quick-connect clamp system. In one version, various lengths of extension tubes 260, 270 (FIGS. 7 and 8) may be removably and selectively positioned between the upper portion 72 and the lower portion 74 depending on depth of the pipe 40.

A second control station 160 is provided in proximity to the second access point 60. In one version, the second control station 160 is operatively connected to the second manifold 170. The second control station 160 has a second control valve 162. The second control valve 162 may be operatively positioned on the second manifold 170, the evacuating conduit 190, or anywhere on the second control station 160 to release selectively the heated pressure medium, gas or air from the hose assembly 10. In one version, the second control valve 162 is positioned at the second control station 160 opposite to the end having the third port 250.

Referring to FIGS. 2B, 3B, 5A, 5B and 5C, the diameter of the first tapered barrel 90 and the second tapered barrel 210 changes, at least, one inch (1") in diameter for every twelve inches (12") in length. In another version, the diameter of the first and second tapered barrels 90, 210 changes at least one inch (1") in diameter for every six inches (6") in length. The diameter of the openings 80, 215 is selected depending on the diameter of the flexible liner 20 being used, which in turn depends on the diameter of the pipeline 40. In one version, the openings 80, 215 have a diameter of at least four inches. The diameter of the openings 80, 215 may be modified without departing from the scope of the specification or the accompanying claims.

Figure 4:
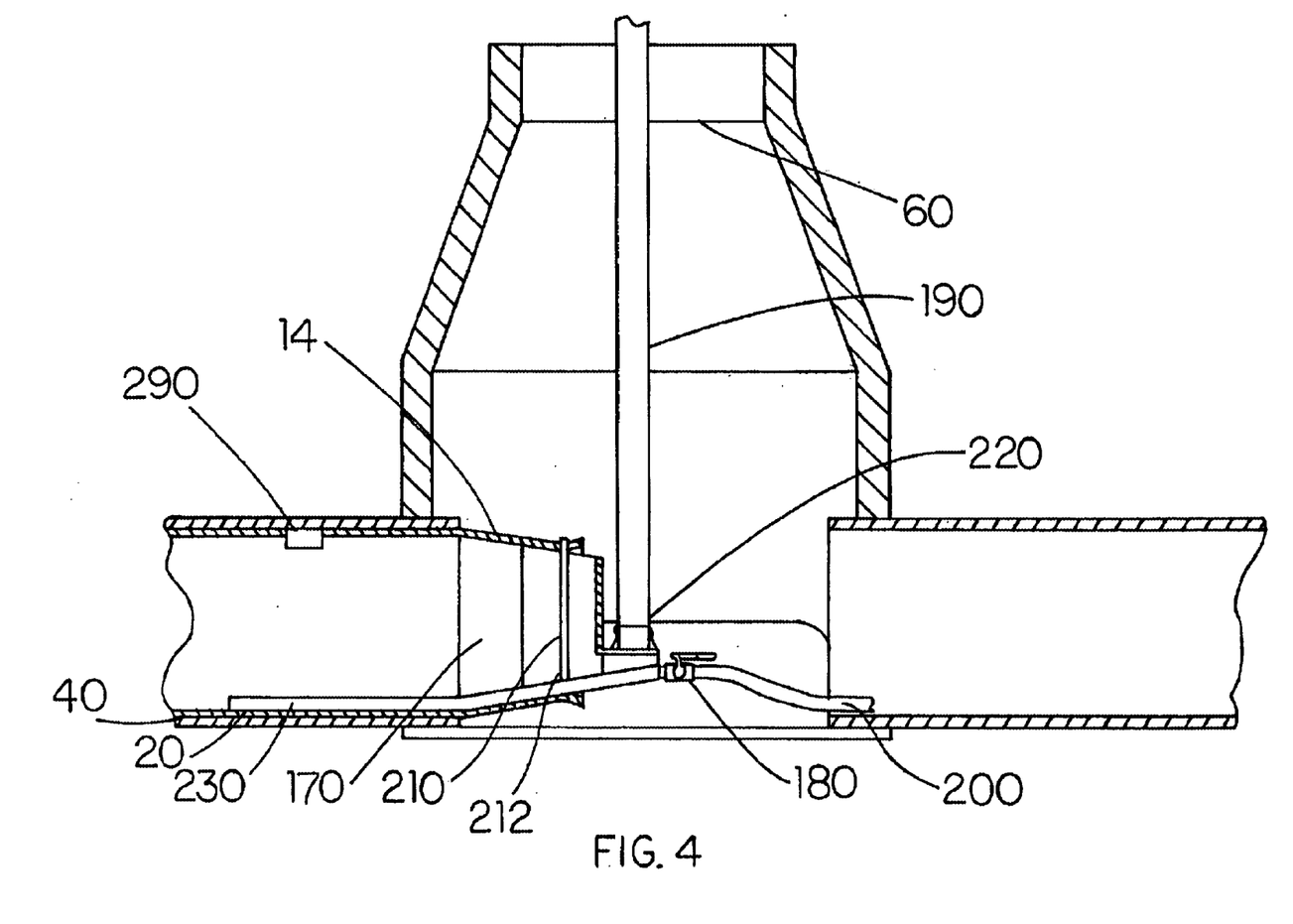
FIG. 4 is a fragmentary view of the second manifold in the pipe.

FIG. 4 shows a fragmentary view of the second manifold 170 in the pipe 40. The hose assembly 10 is securely bound around the second tapered barrel 210 of the second manifold 170 using a clamp 212. In one version, the collection tube 230 is placed within the hose assembly 10 and is attached to the drain 180 to allow fluid collected in the collection tube 230 to flow through the drain 180. In another embodiment, a drain hose 200 is attached on the downstream opening of the drain 180. The evacuating conduit 190 is removably secured to the second port 220 and extends to the second control station 160 where it is removably secured to the third port 250.

Figure 5A:
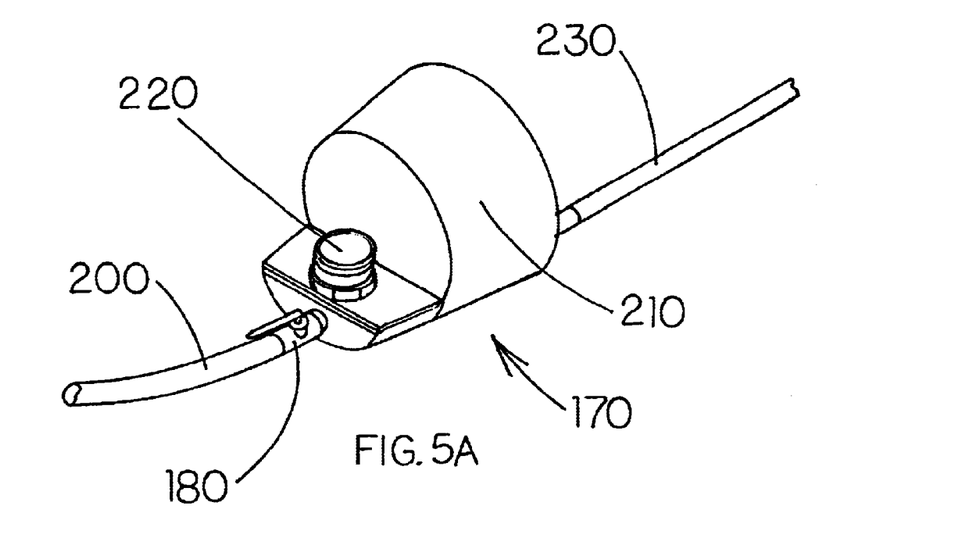
FIG. 5A is a perspective view of the second manifold.
Figure 5B:
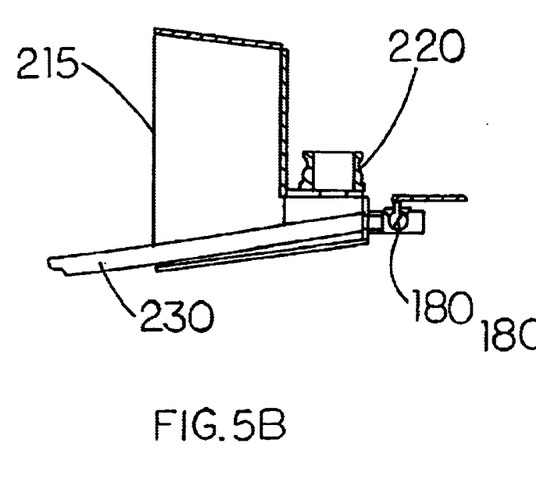
FIG. 5B is a cross-section view of the second manifold.
Figure 5C:
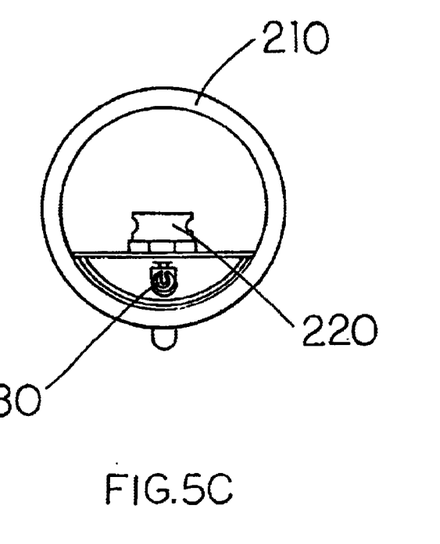
FIG. 5C is an end view of the second manifold.

Referring to FIGS. 5A, 5B and 5C, the second manifold 170 has a second tapered barrel 210, a second clamp 212, a second opening 215, at least one second port 220, and a drain 180. The second manifold 170 is removably secured to the second end 14 in a manner substantially the same as the first manifold 70 is secured to the first end 12. The drain 180 may be selectively opened and closed to void the collection tube 230.

Figure 6:
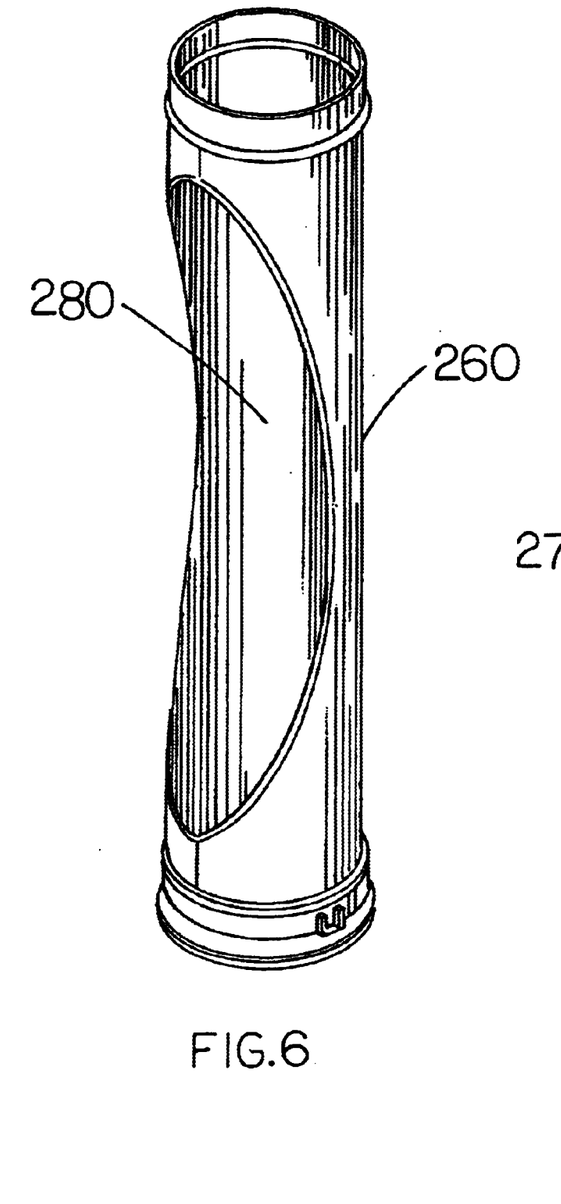
FIG. 6 is a perspective view of a length of an extension tube having an access relief.
Figure 7:
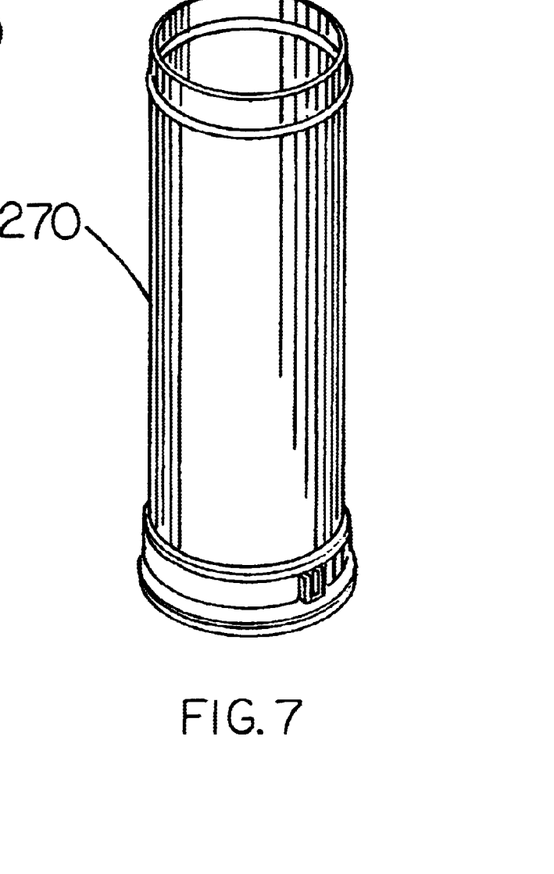
FIG. 7 is a perspective view of a length of an extension tube without an access relief.

Referring to FIGS. 6 and 7, the extension tubes 260, 270 comprise a rigid material. In one embodiment the extension tubes 260, 270 comprise aluminum. In another version, the extension tubes 260, 270 comprise Rainway Model HPRL 1200. In another version, the extension tubes 260, 270 are of 37 11/16 inches in circumference and twelve inches (12") in diameter, by desired length, by one-eighth inch (1/8") aluminum rolled to fit ends and welded. The length of the several sections of the extension tubes 260, 270 may vary. Several sections of extension tubes 260, 270 are capable of being releasably secured to one another in the same manner as the upper and lower portions 72 and 74 are secured to each other to form an extension tube of any desired length while allowing for disassembly. In another version, the extension tubes 260, 270 have an access relief 280.

While specific embodiments of the disclosed invention have been shown and described for the purpose of illustration, the protection offered by any patent which may issue upon this application is not limited to the disclosed embodiments. Rather, the protection extends to all structures, arrangements and processes falling fairly within the scope of the claims appended hereto.

What is claimed is:

1. A process of lining a pipe, the process comprising the steps of:
   a. isolating a segment of pipe requiring relining;
   b. preparing a hose assembly, the hose assembly comprising a flexible liner impregnated within a resin;
   c. introducing the hose assembly into the segment of pipe requiring relining;
   d. expanding the hose assembly so that the hose assembly contacts an inner surface of the pipe by injecting a heated pressurized medium into the hose assembly;
   e. elevating the temperature of the hose assembly to a first temperature range to allow for cross-linking the resin;
   f. elevating the temperature of the hose assembly to a second temperature range;
   g. maintaining the temperature of the hose assembly within the second temperature range for a selected time to allow curing of the resin; and
   h. cooling the hose assembly.

2. The process of claim 1, wherein the hose assembly further comprises a calibration hose, the calibration hose being placed within the flexible liner in a generally parallel position.

3. The process of claim 1, before inserting the heated pressure medium, further comprising the step of removably attaching a plurality of thermocouples to selected locations on the inner surface of the segment of pipe.

4. The process of claim 1, wherein the medium comprises a liquid.

5. The process of claim 1, wherein the medium comprises a gas.

6. The process of claim 1, wherein the medium comprises steam.

7. The process of claim 1, wherein the medium comprises air.

8. The process of claim 1, wherein the volume of the medium is increased in the hose assembly to elevate the temperature to the first temperature range.

9. The process of claim 1, wherein the volume of gas within the hose assembly is increased to elevate the temperature to the first temperature range.

10. She process of claim 1, wherein the resin is selected from the group consisting of a polyester, a vinyl ester or an epoxy resin, and any combination thereof.

11. The process of claim 1, whereas the resin is styrenated or non-styrenated.

12. The process of claim 1, wherein the volume of the heated pressure medium is increased to elevate the temperature of the hose assembly to the second temperature range.

13. The process of claim 1, wherein the first temperature range is from about 110 degrees Fahrenheit to about 200 degrees Fahrenheit.

14. The process of claim 1, wherein the selected pressure range is about 15 pounds per square inch.

15. The process of claim 1, wherein the highest temperature of the second temperature range is no greater than about 300 degrees Fahrenheit.

16. The process of claim 1, wherein the lowest temperature of the second temperature range is at least about 150 degrees Fahrenheit.

17. The process of claim 1, wherein the lowest temperature of the second temperature range is at least about 170 degrees Fahrenheit.

18. The process of claim 1, wherein the lowest temperature of the second temperature range is at least about 190 degrees Fahrenheit.

19. The process of claim 1, wherein the lowest temperature of the second temperature range is at least about 210 degrees Fahrenheit.

20. The process of claim 1, wherein the hose assembly is maintained at the second temperature range for a selected time.

21. The process of claim 20, wherein the selected time is dependent upon a lowest temperature monitored at the plurality of thermocouples.

22. The process of claim 20, wherein the selected time is greater than about five minutes.

23. The process of claim 20, wherein the selected time is greater than about ten minutes.

24. The process of claim 20, wherein the selected time is less than about one hundred and forty minutes.

25. The process of claim 20, wherein the selected time is less than about seventy minutes.

26. The process of claim 1, further comprising the step of monitoring the thermocouples while evacuating the heated pressure medium until all measure temperatures of less than about 100 degree Fahrenheit.

27. The process of claim 1, further comprising the step of continuously introducing the heated pressure medium into the hose assembly while maintaining the hose assembly within the first and second temperature ranges.

28. The process of claim 1, further comprising the step of inserting a collection tube into the flexible liner before the step of introducing the heated pressure medium to allow moisture to be collected and drained from the hose assembly.

29. A process of lining a pipe, the process comprising the steps of:
   a. isolating a segment of a pipe requiring relining, the pipe having an inner surface;
   b. preparing a hose assembly, the hose assembly comprising a flexible liner impregnated with a resin;
   c. introducing the hose assembly into the segment of pipe requiring relining;
   d. removably attaching a plurality of thermocouples to selected locations on the inner surface of the segment of pipe;
   e. removably securing a first manifold to the first end of the hose assembly and removably securing a second manifold to the second end of the hose assembly;
   f. expanding the hose assembly so that the flexible liner contacts the inner surface of the pipe by injecting a heated pressurized medium into the hose assembly;
   g. elevating the temperature of the hose assembly to a first temperature range to allow for cross-linking the resin;
   h. monitoring the thermocouples until the cross-linking reaction exothermss;
   i. elevating the temperature of the hose assembly to a second temperature range;
   j. maintaining the temperature of the hose assembly within the second temperature range for a selected time sufficient to allow for the curing of the resin; and
   k. cooling the hose assembly.

* * * * *